United States Patent [19]
Miyamoto et al.

[11] 4,183,561
[45] Jan. 15, 1980

[54] SEPARATION-PREVENTED PIPE JOINT WHICH CAN BE ASSEMBLED FROM INSIDE PIPE

[75] Inventors: Hiroshi Miyamoto; Tadao Yamaji; Toshi Nakajima; Takao Sagara, all of Amagasaki, Japan

[73] Assignee: Kubota, Ltd., Osaka, Japan

[21] Appl. No.: 865,374

[22] Filed: Dec. 29, 1977

[30] Foreign Application Priority Data

Sep. 9, 1977 [JP] Japan .................. 52/109357

[51] Int. Cl.² .............................. F16L 39/00
[52] U.S. Cl. ..................... 285/321; 285/342; 285/348; 285/369; 285/374; 285/376; 285/404
[58] Field of Search ................ 285/308, 321, 374, 96, 285/97, 104, 105, 109, 376, 294, 360, 297, 342, 348, 369, 404

[56] References Cited

U.S. PATENT DOCUMENTS

| | | | |
|---|---|---|---|
| 1,439,452 | 12/1922 | Shaw | 285/97 X |
| 2,099,722 | 11/1937 | Byers | 285/374 X |
| 2,922,664 | 1/1960 | Risley et al. | 285/96 |
| 3,338,596 | 8/1967 | Knox | 285/321 X |
| 3,432,175 | 3/1969 | Kawai | 285/374 X |
| 3,530,685 | 9/1970 | Ehret | 285/321 X |
| 3,941,410 | 3/1976 | Miyaoka | 285/321 |
| 3,944,263 | 3/1976 | Arnold | 285/96 |
| 3,995,889 | 12/1976 | Carr | 285/360 X |

FOREIGN PATENT DOCUMENTS

| | | | |
|---|---|---|---|
| 671103 | 9/1963 | Canada | 285/321 |
| 2205000 | 8/1973 | Fed. Rep. of Germany | 285/321 |
| 4512788 | 9/1965 | Japan | 285/321 |

*Primary Examiner*—Dave W. Arola
*Attorney, Agent, or Firm*—Joseph W. Farley

[57] ABSTRACT

The open end inner periphery of a socket is provided with an annular groove, and at a suitable sufficient distance from the annular groove axially toward the innermost side of the socket a seal member stopping projection extends from the inner surface of the socket toward the outer peripheral surface of a spigot. A split lock ring is fitted in the annular groove. The outer peripheral surface of the spigot is provided with a projection which is disposed between the split lock ring and the stop projection and which is axially movable therebetween along with the spigot and adapted to engage with them at the ends of its travel. A seal member is disposed between a seal member supporting surface disposed inwardly of the stop projection and the outer peripheral surface of the spigot. This seal member is urged toward the stop projection by an urging device. A member for preventing the radial expansion of the lock ring is interposed between the bottom of the annular groove and the outer peripheral surface of the lock ring. This member comprises a flexible tube and a filler injected into the tube. The filler is initially fluid and afterwards solidifies.

12 Claims, 8 Drawing Figures

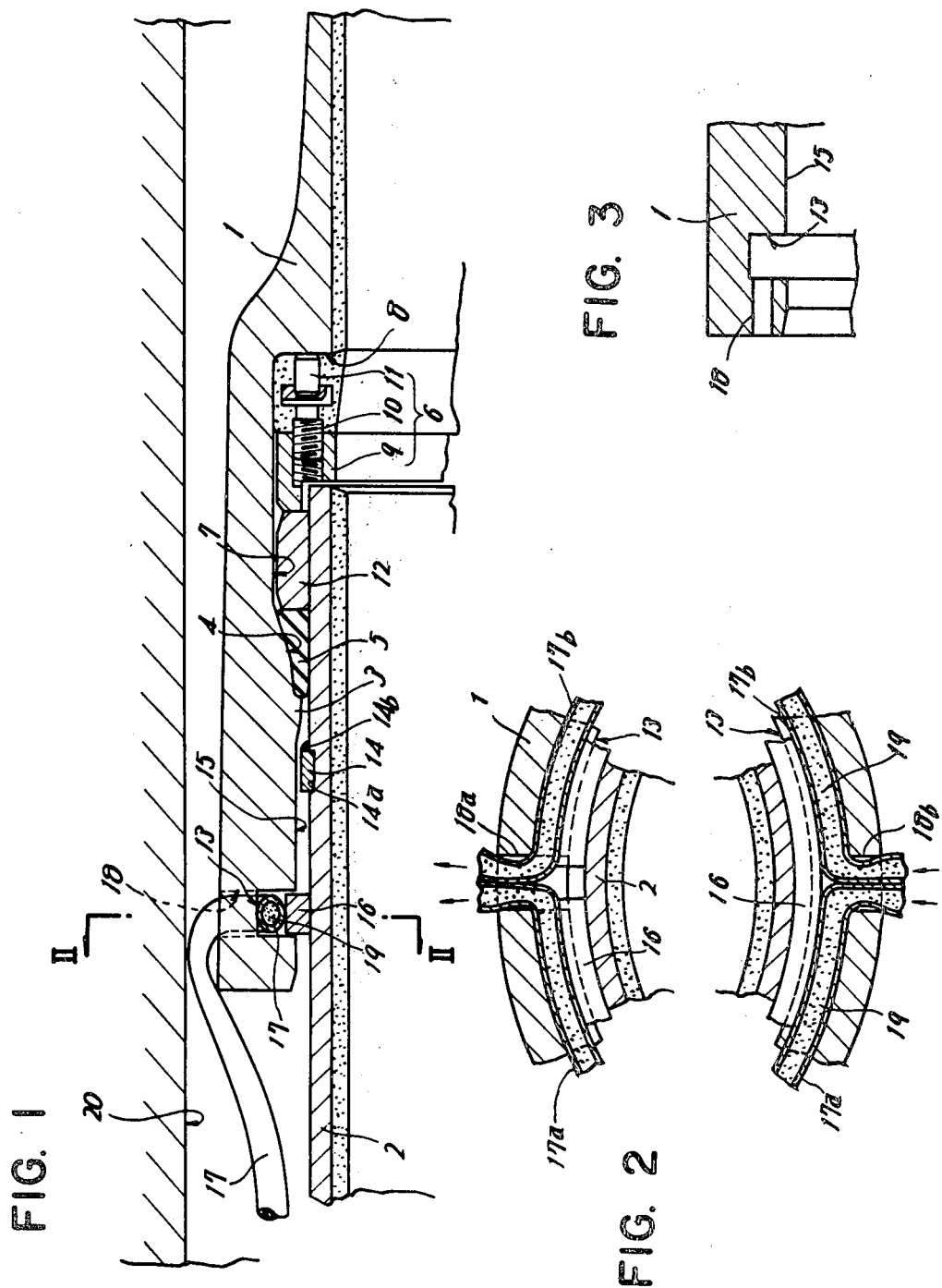

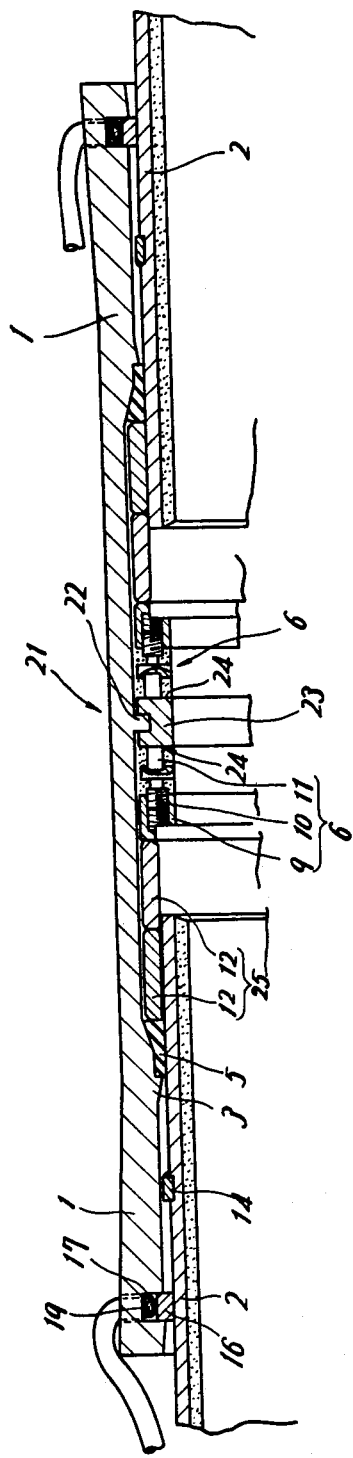
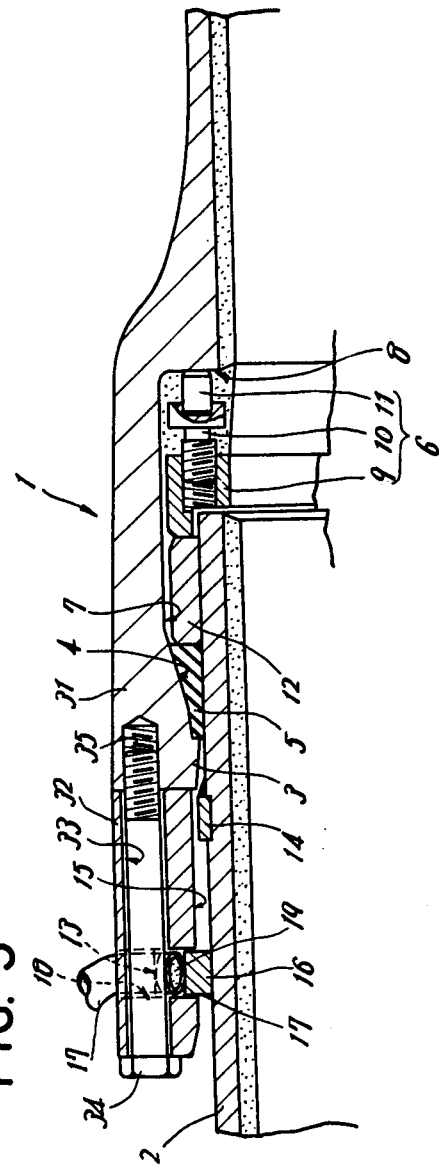

SEPARATION-PREVENTED PIPE JOINT WHICH CAN BE ASSEMBLED FROM INSIDE PIPE

The present invention relates to a pipe joint which can be assembled from inside the pipe and more particularly it relates to a separation-prevented pipe joint which can be assembled from inside the pipe and which has the so-called earthquake-resistant function which prevents separation between the socket and spigot while allowing axial relative movement between them within a given range, wherein no working space around the outer periphery of the pipe is required for the prevention of separation.

As for the separation preventing mechanism for pipe joints, there has been proposed an arrangement wherein a split lock ring which is radially contractable so as to be fitted on the outer peripheral surface of the spigot is fitted in an annular groove formed in the inner peripheral surface of the socket and is axially engageable with a projection on the outer peripheral surface of the spigot. In the case of a large-diameter pipe, however, said lock ring, even if formed to have a radially contracting force, tends to sag under its own weight, becoming unable to come into pressure contact with the outer peripheral surface of the spigot. As a result, a problem arises in that no reliance can be placed on the separation preventing function provided by the engagement between said lock ring and said projection on the spigot. Particularly, when axial relative movement and/or angular displacement between the socket and spigot is allowed, it does not necessarily follow that the lock ring and the spigot projection uniformly engage with each other over the entire periphery. Therefore, there is danger of the lock ring being radially deformed, resulting in the disengagement between said projection and said lock ring. To solve this problem, there have been proposed various sytems including one in which the socket is formed with threaded openings extending from the outer peripheral surface of the socket to the bottom of said annular groove and set-bolts are screwed into said threaded openings to maintain the lock ring in its radially contracted condition. According to this system, however, since the operation of the set-bolts has to be effected from outside the socket during assembly, this contradicts the joint being assembled from inside the pipe. Particularly when a pipe is to be installed in an already installed pipe or a hole drilled in the ground whose diameter is nearly equal to the outer diameter of the first-mentioned pipe, the operation of mounting said set-bolts becomes impossible. For this reason, in the past a pipe joint which can be assembled from inside the pipe and which has an earthquake-resistant function has not been proposed.

A principal object of the present invention is to solve such problem and provide a pipe joint which can be assembled from inside the pipe and which has an earthquake-resistant function.

To this end, the invention provides a separation-prevented pipe joint which can be assembled from inside the pipe, comprising a socket, a spigot inserted in said socket, a split lock ring fitted in an annular groove formed in the open end inner periphery of the socket, a projection formed on the outer peripheral surface of the spigot so as to be engageable with said split lock ring axially from the inside, a seal member positioned axially inwardly of a seal member stopping projection formed on the inner surface of the socket axially inwardly of the first-mentioned projection, said seal member being disposed between a seal member supporting surface and the outer peripheral surface of the spigot, and means for urging said seal member toward said stopping projection, said pipe joint being characterized in that (a) the portion of the inner peripheral surface of the socket between said annular groove and said seal member stopping projection has a length equal to the sum of the axial width of said spigot projection and the distance for the allowable axial relative movement between the socket and spigot and also has an inner diameter such that there is defined a space between the inner peripheral surface of the socket and the outer peripheral surface of said spigot projection, (b) formed axially inwardly of said seal member supporting surface are an inner cylindrical surface defining a space for receiving said urging means and a radially inwardly extending innermost socket step surface which is continuous with said inner cylindrical surface and with which the end of said urging means engages; (c) a relay ring is interposed between said seal member and said urging means to maintain a fixed distance therebetween so as to prevent disengagement between the outer peripheral surface of the spigot and the seal member during the axial relative movement between the socket and spigot; and, (d) means is provided between the bottom of said annular groove and the outer peripheral surface of said lock ring for preventing the radial expansion of said lock ring to maintain the same fitted on the outer peripheral surface of the spigot.

According to this pipe joint, since the socket is longer than when it has no earthquake-resistant function by about twice the distance provided for the allowable axial relative movement between the socket and spigot, there may be cases where undesirable problems arise from the standpoint of projection, although this can be solved. In such cases, said socket is able to be constructed by a first socket portion integral with the pipe and having its open end defined by said seal member stopping projection, and a second substantially cylindrical socket portion formed separately from said first socket portion and connected coaxially to the same. As for the arrangement for connecting these first and second socket portions, various types may be contemplated.

Further, according to a preferred embodiment of the invention, said means for preventing the radial expansion of the lock ring comprises a flexible tube interposed between said bottom of said annular groove and the outer peripheral surface of the lock ring, and a filler which is initially fluid when injected into said tube and thereafter solidifies.

Other numerous features and merits of the invention will be readily understood from various embodiments of the invention to be described below with reference to the accompanying drawings.

FIG. 1 is a longitudinal section of a first embodiment of a pipe joint according to the present invention;

FIG. 2 is a view showing the principal portion as viewed in the direction of arrow II—II of FIG. 1;

FIG. 3 is a fragmentary view, in longitudinal section, showing a modification of the open end of the socket;

FIG. 4 is a longitudinal section showing a second embodiment wherein the invention is applied to a sleeve type pipe joint;

FIGS. 5 through 7 are longitudinal sections of third through fifth embodiments showing modifications wherein the socket is divided into first and second socket portions which are then connected together.

Figure 6:
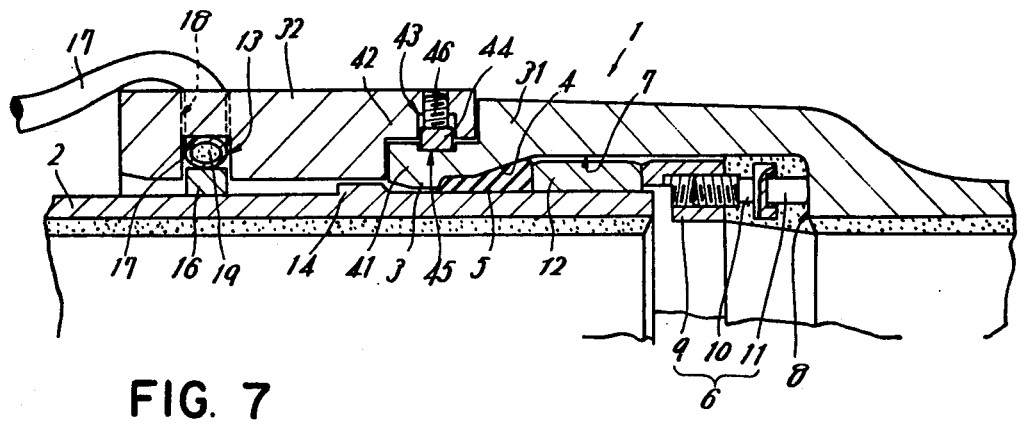

Referring to FIGS. 1-2, the numeral 1 designates a socket and 2 designates a spigot inserted in said socket. A seal member stopping projection 3 is positioned substantially at the middle of the axial extent of the socket 1 and radially extends from the inner peripheral surface of the socket to terminate in the vicinity of the outer peripheral surface of the spigot 2, and the portion of the inner surface of the socket positioned axially inwardly of said seal member stopping projection 3 provides a seal member supporting surface 4 tapering toward the outer periphery of the lateral surface of said projection 3. Designated at 5 is a seal member interposed between the seal member supporting surface 4 and the outer peripheral surface of the spigot 2 and being in the form of an annular body of rubber or the like. Disposed axially inwardly of said seal member supporting surface 4 toward the innermost part of said socket are an inner cylindrical surface 7 defining a space for receiving urging means 6 for urging the seal member 5 toward the stop projection 3, and an innermost socket end step surface 8 continuous with said inner cylindrical surface 7 and extending radially inwardly toward the pipe axis. The urging means 6 comprises a pressing ring 9 circumferentially divided into a plurality of pieces, set-bolts 10 screwed in at places suitably spaced circumferentially of said pressing ring 9, and extension pins 11 adding to said set-bolts 10 and abutting against the innermost socket end step surface 8, said set-bolts being unscrewed from the pressing ring 9 to urge the seal member 5.

In such a pipe joint which can be assembled from inside the pipe, according to the present invention, a relay ring 12 which is circumferentially divided into a plurality of pieces is interposed between said seal member 5 and the pressing ring 9 to secure a fixed distance therebetween so that during the axial relative movement between the socket 1 and spigot 2, the disengagement between the outer peripheral surface of the spigot and the seal member 5 may not be caused, i.e., the front end of the spigot may be moved between the seal member 5 and the pressing ring 9. Further, the socket 1 extends from the seal member stopping projection 3 toward the open end thereof over a long distance and is formed with an annular groove 13 around the open end. On the outer peripheral surface of the spigot 2 is a projection 14 which is positioned on the open socket end side of the seal member stopping projection 3, i.e., axially outwardly of the same, and axially inwardly of said annular groove 13, and which is engageable with said projection 3. The projection 14 is provided by forming a shallow groove 14a in the outer peripheral surface of the spigot 2, fitting in said annular groove a ring member whose thickness is greater than the depth of said annular groove, and fixing said ring member to the spigot 2 by a weld 14b extending along the lateral surface of said ring member facing toward the open end side of the spigot, the bead of the weld 14b forming a taper portion facing toward the open end side of the spigot. In addition, the projection 14 may be formed integral with the spigot at the time of casting or producing. Further, the projection may be a short one and then a plurality of such projections may be circumferentially equispaced around the periphery of the spigot 2. The portion of the inner peripheral surface 15 of the socket 1 has a length equal to the sum of the axial width of the projection 14 and the distance provided for the allowable axial movement between the socket and spigot and the inner diameter of said surface 15 is such that a space is defined between the surface 15 and the outer peripheral surface of said projection 14. A split lock ring 16 which is fitted on the outer peripheral surface of the spigot and which is axially engageable with said projection 14 is fitted in said annular groove 13. Flexible tube means 17 for preventing the radial expansion of the lock ring is interposed between the bottom of the annular groove 13 and the outer peripheral surface of the lock ring 16 and extends around the entire circumference, the ends of said tube being led out of the pipe through tube insertion port or ports 18 extending between the outer peripheral surface of the socket 1 and the bottom of the annular groove 13. As for the tube means 17, it is desirable that, as shown in FIG. 2, two tubes 17a and 17b be used, each extending around half the circumference, the ends of said tubes being led out of the pipe through two tube insertion ports 18a and 18b. However, said tube means may be in the form of an annular tube with vent tube and an injection tube led in through the tube insertion ports 18a and 18b and connected to the top and bottom of said annular tube. According to circumstances, a single tube may be wound in an annular form and its ends may be led out through a single tube insertion port 18. In addition, the tube insertion port or ports 18 may extend axially of the pipe from the open end surface of the socket 1 to the lateral side of the annular groove 13, as shown in FIG. 3. Mortar having a foaming agent mixed therewith, epoxy resin or other filler 19 which is initially fluid and afterwards solidifies is injected into the tube means 17 to expand the latter so as to radially contract or at least prevent the radial expansion of the lock ring 16 for maintaining the lock ring in its position fitted on the spigot 2. Designated at 20 is the inner peripheral surface of an already installed pipe or of an excavated hole inside which piping is to be installed.

According to such arrangement, an axial relative movement between the socket 1 and spigot 2 is allowed until the projection 14 on the spigot 2 engages with the lock ring 16 or the seal member stopping projection 3 on the socket 1, while the separation between the socket 1 and spigot 2 is prevented by the engagement between the lock ring 16 and the projection 14 on the spigot 2. In this connection, since the space between the outer peripheral surface of the lock ring 16 and the bottom of the annular groove 13 is filled with the tube means 17 containing the filler 19 which has solidified, there is no possibility of the lock ring 16 being radially expanded inadvertently, so that the prevention of separation by the engagement between the lock ring 16 and the projection 14 on the spigot can be assured.

In the jointing operation, first the tubes 17a and 17b are disposed in the annular groove 13 while putting the lock ring 16 in said annular groove 13. Thereafter, the spigot 2 is inserted in the socket 1. In this connection, the provision of the taper portion 14b at the projection 14 on the spigot 2 facilitates the passage of the projection 14 across the lock ring 16. Thereafter, the seal member 5, relay ring 12 and pressing ring 9 are successively placed in their predetermined positions from inside the pipe, i.e., from between the front end of the spigot 2 and the innermost end step surface 8 of the socket 1 and the set-bolts 10 are turned in the unscrewing direction to compress the seal member 5. On the other hand, the filler 19 is injected into the tube means 17 from its downwardly led-out end, as by a grouting pump, to expand the tube 17. During this operation, the upwardly led-out end of the tube 17 is left open for air escape. Such injection from below assures filling in such a manner as to leave no voids. Upon completion of the injection of the filler 19, the ends of the tube means are closed and the remainder is cut off to complete the jointing operation. The filler 19 injected into the tube means 17 is left as it is so that it solidifies, whereby it maintains the lock ring 16 in its radially contracted position. In addition, in a method of construction for inserting pipes in an already installed pipe or a hole 20 drilled in the ground, prior to the insertion of the spigot of a subsequent pipe the ends of the tube means 17 are led to the socket end of the subsequent pipe and after the pipe jointing operation, the filler 19 will be injected at the position of said other end. In this way, in a method of construction for inserting pipes in an already installed pipe or the like, the operation for maintaining the radially contracted position of the lock ring 16 can be easily carried out.

FIG. 4 shows a second embodiment of the invention applied to a sleeve type pipe joint, wherein the two halves of a sleeve 21 each have an arrangement corresponding to said socket 1. The components, including the sockets 1, which are substantially the same as in the preceding embodiment are given like numerals and a description thereof is omitted. Spigots 2 are inserted in the opposite sockets 1 of the sleeve 21 and joined thereto. An engaging projection 22 is formed axially centrally of the sleeve 21 and an anchoring ring 23 of substantially U-shaped cross-section circumferentially split at a place or places is fitted on said engaging projection, the opposed lateral surfaces 24 of said engaging ring 23 corresponding to the innermost end step surface 8 of the socket 1 in the first embodiment. In addition, instead of providing the anchoring ring 23, the anchoring projection 22 may be formed to the same size as the anchoring ring 23. In this embodiment, two relay rings 12, into which a relay ring 25 having the required length is divided, are provided. When the relay ring 25 is axially divided into parts in this way, even if a large distance is provided for axial relative movement between the sockets 1 and the spigots 2 while the distance between the front end of the spigot 2 and the lateral surface 24 of the anchoring ring is short, the operation for installing the relay ring can be easily carried out.

Each of the third through fifth embodiments shown in FIGS. 5 through 8 provides a socket 1 which is axially divided to provide a first socket portion 31 integral with the pipe and a second cylindrical socket portion 32 formed separate from said first socket portion 31 and coaxially connected to the latter. A seal member 5, relay ring 12 and urging means 6 are set in the first socket portion 31 while an annular groove 13 is formed in the front end inner periphery of the second socket portion 32 and a split lock ring 16 and tube means 17 are set in said annular groove 13. The different embodiments illustrate different arrangements for connecting the first and second socket portions 31 and 32.

In FIG. 5, the second socket portion 32 is formed with axially extending and circumferentially suitably spaced bolt holes 33, and bolts 34 extending through said holes 33 are screwed into threaded holes 35 formed in the front end surface of the first socket portion 31, whereby the second socket portion 32 is fixed to the front end surface of the first socket portion 31.

In FIG. 6, the front end of the first socket portion 31 is formed with a small diameter male step 41 while the connecting end of the second socket portion 32 is formed with a large diameter female step 42, and these steps 41 and 42 are fitted together. A split lock ring 44 having a radially expanding force is fitted in an annular groove 43 formed in the inner peripheral surface of the female step 42. An annular groove 45 is formed in the outer peripheral surface of the male step 41 and opposed to said annular groove 43. With the two steps 41 and 42 fitted together, the split lock ring 44 fitted in the annular groove 43 is radially contracted by being urged by a set-bolt 46 screwed into a threaded hole extending from the bottom surface of the annular groove 43 to the outer peripheral surface of the second socket portion 32 and is thereby forced into the annular groove 45 so as to connect the second socket portion 32 to the first socket portion 31.

Figure 7:
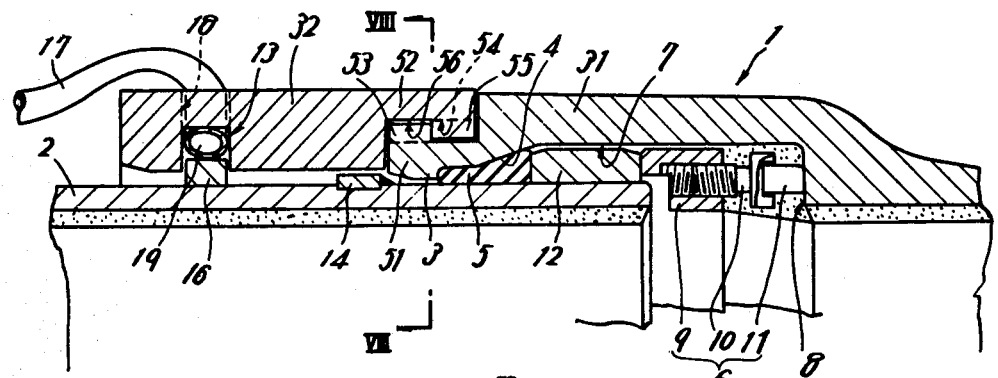
Figure 8:
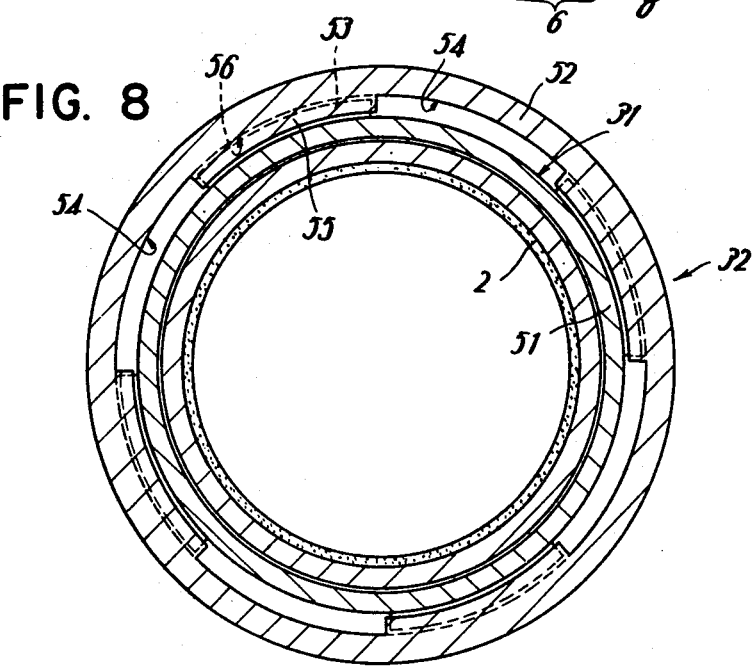
FIG. 8 is a cross-sectional view taken in the direction of arrow VIII—VIII of FIG. 7.

In FIGS. 7 and 8, the front end of the first socket portion 31 is formed with a small diameter male step 51 while the connecting end of the second socket portion 32 is formed with a large diameter female step 52, and these steps 51 and 52 are connected together. The front half of the male step 51 is formed with a plurality of circumferentially equispaced projections 53 while the inner periphery of the front half of the female step 52 is formed with notches 54 which just allow the passage of said projections 53 therethrough and also with projections 55 which alternate with said notches 54. Further, the inner periphery of the other half of the female step 52 is formed with an annular groove 56 capable of receiving said projections 53 at any circumferential positions. Therefore, it is possible to engage the projections 53 and 55 with each other axially of the pipe by fitting the female step 52 of the connecting end of the second socket portion 32 on the male step 51 in such a manner as to allow the projections 53 on the first socket portion to pass through the notches 54 and rotating the second socket portion 32 a suitable amount with the projections 53 positioned inside the annular groove 56. In this way the second socket portion 32 is attached to the first socket portion 31 while being prevented from slipping off.

It will be understood that in fitting the socket and spigot of the embodiments of FIGS. 5–8 together, the socket portion 32 is first attached to the socket portion 31 and the operation is then carried out as previously described.

We claim:

1. A separation-prevented pipe joint which can be assembled from inside the pipe, comprising a socket, a spigot inserted in said socket, a split lock ring fitted in an annular groove formed in the open end inner periphery of the socket said split lock ring being engageable with the outer peripheral surface of the spigot, a projection formed on the outer peripheral surface of the spigot so as to be engageable with said split lock ring axially from the inside, a seal member interposed between the outer peripheral surface of the spigot and a seal member supporting surface tapering from the inner side of the socket toward a seal member stopping projection formed on the inner surface of the socket at a place axially inwardly of said first projection, and means for urging said seal member toward said seal member stopping projection, said pipe joint being characterized in that (a) the portion of the inner peripheral surface of the socket between said annular groove and said seal member stopping projection has a length equal to the sum of the axial width of said spigot projection and the distance for the allowable axial relative movement between the socket and the spigot and also has an inner diameter such that there is defined a space between the inner peripheral surface of the socket and the outer peripheral surface of said spigot projection;

(b) formed on the socket axially inwardly of said seal member supporting surface are an inner cylindrical surface defining a space for receiving said urging means and a radially inwardly extending innermost socket step surface which is continuous with said inner cylindrical surface and with which the end of said urging means engages;

(c) a relay ring is interposed between said seal member and said urging means to maintain a fixed distance therebetween so as to prevent disengagement between the outer peripheral surface of the spigot and the seal member during the axial relative movement between the socket and spigot; and (d) means for preventing radial expansion of said lock ring from a fitted relation with the outer peripheral surface of the spigot and said annular groove comprises port means communicating with said annular groove from the outside of the socket, a flexible tube extending through said port means and interposed between the bottom of said annular groove and the outer peripheral surface of the lock ring, said flexible tube having inlet and outlet ends locatable in desired positions remotely of the pipe joint, and a filler which is injected in a fluid condition into said tube through said inlet end thereof and which thereafter solidifies, said outlet end forming vent means for the escape of air in said tube displaced by said injected filler.

2. A pipe joint as set forth in claim 1, wherein said port means comprises an upper port and a lower port formed in the upper and lower regions respectively of the socket, and two tubes each wound around half the circumference of the annular groove are introduced into one port and are withdrawn from the other port.

3. A pipe joint as set forth in claim 2, wherein each of said tubes extends to the outlet end thereof through said upper port.

4. A pipe joint as set forth in claim 1, wherein said socket comprises a first socket portion integral with the pipe and having its open end defined by said seal member stopping projection, and a second substantially cylindrical socket portion formed separately from said first socket portion and connected coaxially to the same.

5. A pipe joint as set forth in claim 4, wherein said first and second socket portions are connected together by bolts extending through the second socket portion axially of the pipe.

6. A pipe joint as set forth in claim 4, wherein the front end outer periphery of said first socket portion is formed with a small diameter male step on which is fitted a large diameter female step formed on the inner periphery of the connecting end of said second socket portion, and a split lock ring is fitted in two annular grooves one of which is formed in the outer peripheral surface of the male step and the other of which is formed in the inner peripheral surface of the female step, so that the first and second socket portions are connected together by the axial engagement of the split lock ring with said two annular grooves.

7. A pipe joint as set forth in claim 4, wherein the front end outer periphery of said first socket portion is formed with a small diameter male step on which is fitted a large diameter female step formed on the inner periphery of the connecting end of the second socket portion, the respective front halves of the mutually opposed peripheral surfaces of said male and female steps are formed with a plurality of circumferentially suitably spaced projections in such a manner that the projections on each front half can pass between the projections on the other, so that the first and second socket portions are connected together by axially engaging these projections with each other.

8. A pipe joint as set forth in claim 1, wherein said socket constitutes the two halves of a sleeve.

9. A pipe joint as set forth in claim 1, wherein said relay ring is axially divided into a plurality of parts.

10. A separation-prevented pipe joint which can be assembled from inside the pipe, comprising a socket, a spigot inserted in said socket, a split lock ring fitted in an annular groove formed in the open end inner periphery of the socket said split lock ring being engageable with the outer peripheral surface of the spigot, a projection formed on the outer peripheral surface of the spigot so as to be engageable with said split lock ring axially from the inside, and seal means interposed between the outer peripheral surface of the spigot and the inner surface of the socket, wherein the improvement comprises:

means for preventing radial expansion of said lock ring from a fitted relation with the outer peripheral surface of the spigot and said annular groove comprising port means communicating with said annular groove from the outside of the socket, a flexible tube extending through said port means and interposed between the bottom of said annular groove and the outer peripheral surface of the lock ring, said flexible tube having inlet and outlet ends locatable in desired positions remotely of the pipe joint, and a filler which is injected in a fluid condition into said tube through said inlet end thereof and which thereafter solidifies, said outlet end forming vent means for the escape of air in said tube displaced by said injected filler.

11. A pipe joint as set forth in claim 10, wherein said port means comprises an upper port and a lower port formed in the upper and lower regions respectively of the socket, and two tubes each wound around half the circumference of the annular groove are introduced into one port and are withdrawn from the other port.

12. A pipe joint as set forth in claim 11, wherein each of said tubes extends to the outlet end thereof through said upper port.

* * * * *